No. 895,961. PATENTED AUG. 11, 1908.
L. CASE.
DISK SUPPORT FOR PLOWS.
APPLICATION FILED JULY 19, 1904.
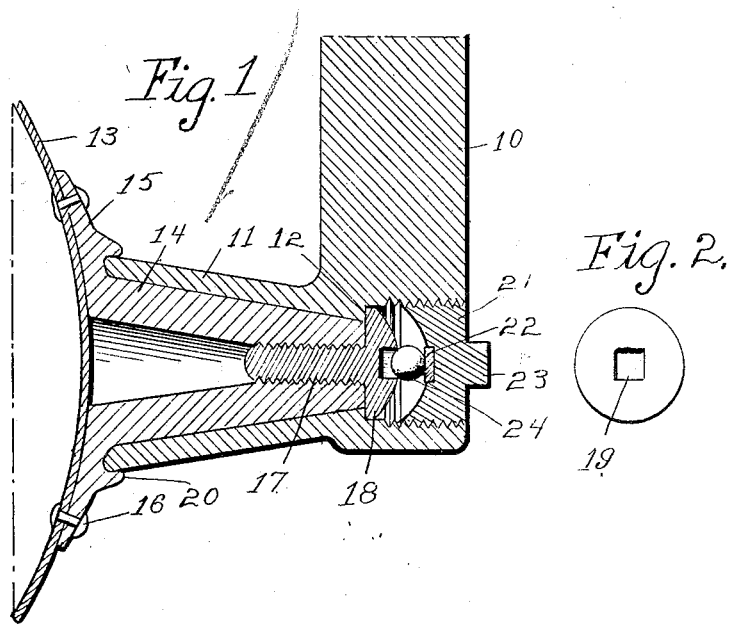
Witnesses
A. G. Hague
J. B. Smutney
Inventor: Livingston Case
By Orwig & Lane Attys

UNITED STATES PATENT OFFICE.

LIVINGSTON CASE, OF BONDURANT, IOWA, ASSIGNOR OF ONE-HALF TO H. E. TALBOTT, OF DES MOINES, IOWA.

DISK-SUPPORT FOR PLOWS.

No. 895,961.      Specification of Letters Patent.      Patented Aug. 11, 1908.

Application filed July 19, 1904. Serial No. 217,189.

*To all whom it may concern:*

Be it known that I, LIVINGSTON CASE, a citizen of the United States, residing at Bondurant, in the county of Polk and State of Iowa, have invented a certain new and useful Disk-Support for Plows, of which the following is a specification.

The objects of my invention are to provide an improved support for disk plows and the like, of simple, durable and inexpensive construction in which all of the parts may be readily and quickly adjusted, removed and replaced and in which the disk will rotate on the support with a minimum of friction and the bearings will be kept relatively free from dust.

My invention consists in certain details in the construction, arrangement and combination of the various parts of the invention, whereby the objects contemplated are attained, as hereinafter more fully set forth, pointed out in my claims and illustrated in the accompanying drawings, in which—

Figure 1 shows a vertical, central, sectional view of a portion of a disk having my support connected therewith. Fig. 2 shows an end elevation of the screw provided with an opening to receive a bearing ball.

Referring to the accompanying drawings, I have used the reference numeral 10 to indicate the shank of the support. Formed on the lower end of the shank is a hollow tapered bearing largest at its outer end. At the narrow end of the tapered bearing is an internally screw-threaded opening of somewhat greater diameter than the smaller end of the bearing opening, forming a shoulder 12 at the point where these openings come together.

The disk is indicated by the reference numeral 13 and is of concavo-convex form. Riveted to the central portion of the convex side of the disk is a journal 14 tapered to fit the interior of the bearing 11 and formed with a flange 15 the outer face of which is shaped to fit the adjacent surface of the disk and is connected therewith by rivets 16. The said journal is formed hollow and its smaller end is formed with a screw-threaded opening.

I have provided for securing the journal in the bearing as follows: The numeral 17 indicates a screw seated in the screw-threaded opening of the journal and formed with an enlarged head 18 flat on one face and rounded on the other. The rounded face provided with an angular opening 19 and the flat face of a diameter greater than the diameter of the adjacent portion of the journal so that when the screw is seated in the journal, its flat face will engage the shoulder 12 of the support 10. In this way the journal is held against movement outwardly from the support 10. Formed on the outer face of the flange 15 is an annular rim 20 designed to overlap the adjacent portion of the bearing 11 and form therewith a dust tight joint. When the disk plow is in use, the resistance of the ground upon the disk causes a thrust upon the journal inwardly toward the narrow end of the bearing and I have provided means to minimize the friction between the journal and the bearing as follows:

The numeral 21 indicates a screw-threaded plug designed to enter the screw-threaded opening in the support, its inner face is concave and at the center of this concave portion is a hardened steel plate 22. The outer face of the plug is formed with a projection 23 by which the plug may be grasped to turn it and the numeral 24 indicates a bearing ball of a size to partially enter the annular opening 19 of the screw head 18 and to be held thereby against the center of the plate 22. In this way the bearing ball 24 receives the major portion of the thrust of the journal and prevents the journal from binding in the tapered bearing.

In use the screw 17 is adjusted so that its head will engage the shoulder 12 when the journal is in such position in the bearing that it will freely turn. Then the bearing ball 24 is placed in the opening 19 and finally the plug 21 is adjusted to position where its plate 22 will engage the bearing ball. The said plug also tightly closes the opening in the support and thus prevents any dust from entering this end of the bearing. After wear has taken place on the bearing ball, the screw 17 can readily be readjusted to tighten the bearing ball, and the journal and bearing may be cleaned by simply removing the plug 21.

Having thus described my invention, what I claim and desire to secure by Letters Patent of the United States, therefor is—

The combination of a support formed with a hollow bearing and with a screw threaded opening communicating with the hollow bearing and of larger diameter than the adjacent portion of the hollow bearing, a disk, a journal fixed to the disk and inserted in the hollow bearing, a screw seated in the end of the journal with its head in the opening of the support and in engagement with the support, a screw threaded plug in said screw threaded opening and a bearing ball engaging the head of the screw and the said screw threaded plug.

LIVINGSTON CASE.

Witnesses:
J. RALPH ORWIG,
S. F. CHRISTY.